Figure 1:
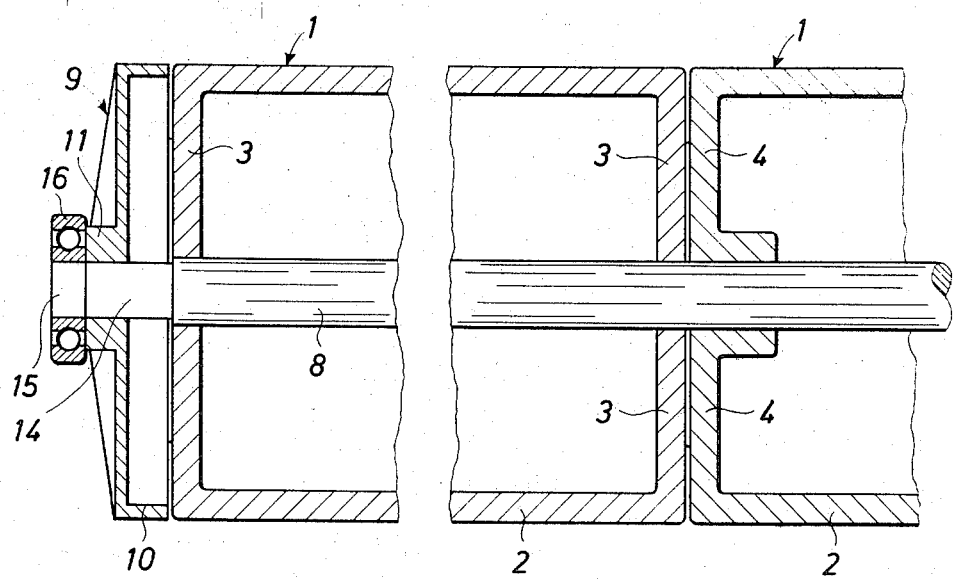

United States Patent
Jorgenso

[11] 3,779,356
[45] Dec. 18, 1973

[54] ROLLER FOR ROLLER CONVEYORS
[75] Inventor: Torben Jorgenso, Kolding, Denmark
[73] Assignee: Kastrup og Holmegaards Glasvaerker A/S, Copenhagen K., Denmark
[22] Filed: Feb. 11, 1972
[21] Appl. No.: 225,574

[30] Foreign Application Priority Data
Feb. 12, 1971  Denmark ............................. 647
Aug. 31, 1971  Denmark ............................. 4261

[52] U.S. Cl. ................................................ 193/37
[51] Int. Cl. ............................................ B65g 13/00
[58] Field of Search ..................... 64/9 R; 192/108; 193/35–37; 198/127 R; 287/103, 117, 129, 130

[56] References Cited
UNITED STATES PATENTS
| | | | |
|---|---|---|---|
| 3,198,411 | 8/1965 | Cope | 193/37 X |
| 2,743,592 | 5/1956 | Nagy | 64/9 R |
| 1,922,039 | 8/1933 | Harris | 198/127 R X |
| 2,604,381 | 7/1952 | Hill | 287/125 UX |
| 3,406,443 | 10/1968 | De Ridder | 287/117 X |
| 119,504 | 10/1871 | Brooks | 193/37 X |
| 932,744 | 8/1909 | Adams | 287/117 UX |
| 1,759,220 | 5/1930 | Brown | 193/37 X |

FOREIGN PATENTS OR APPLICATIONS
305,900   2/1929   Great Britain ................. 198/127 R

*Primary Examiner*—Evon C. Blunk
*Assistant Examiner*—W. Scott Carson
*Attorney*—John W. Malley et al.

[57] ABSTRACT

A roller for a roller conveyor adapted to be mounted together with one or more other like rollers to constitute a composite roller means of desired length. The roller is adapted to be manufactured of plastic material in a blow casting process, so that the manufacturing cost will be low. The roller is provided with coupling means for coupling with other rollers or coupling members for building a composite roller means. The coupling means are adapted for easy disengagement and for rigid and strong connection between all the elements in the composite roller.

5 Claims, 4 Drawing Figures

ROLLER FOR ROLLER CONVEYORS

The invention relates to a roller for roller conveyors, the said roller consisting of a cylindrical body having at least at one end coupling means for coupling it with a connecting member or another roller for forming a composite roller.

In a known construction of such a roller conveyor the rollers consist of tubes open at one end and having at the other end an end wall with a slide bearing for a shaft. The tube sections are joined by gluing and manufactured by injection moulding or by more complicated methods.

An essential feature of the conveying roller according to the present invention is that the cylindrical body has end walls at both ends, the said end walls defining together with the cylindrical wall a hollow space, and that at least one end wall is formed with coupling means adapted for readily disengageable mesh with corresponding coupling means of an adjoining roller or a connecting member.

A roller of such construction affords several advantages over the known conveying rollers. Since each roller is a closed body, it may be manufactured by blow casting, which reduces the cost of manufacture, and since the roller has an end wall at either end, a composite roller composed of such rollers will be of greater rigidity and possess greater carrying capacity than known rollers in which each roller section has only one end wall.

Since the individual roller of a composite roller are connected with one another by readily disengageable coupling means, a conveyor of desirable width may readily be built up, and each individual roller may quickly and easily be taken apart and an individual roller replaced. A conveyor already built up may also readily be converted into a conveyor of narrower width.

The invention will now be described with reference to the drawing, in which

Figure 2:
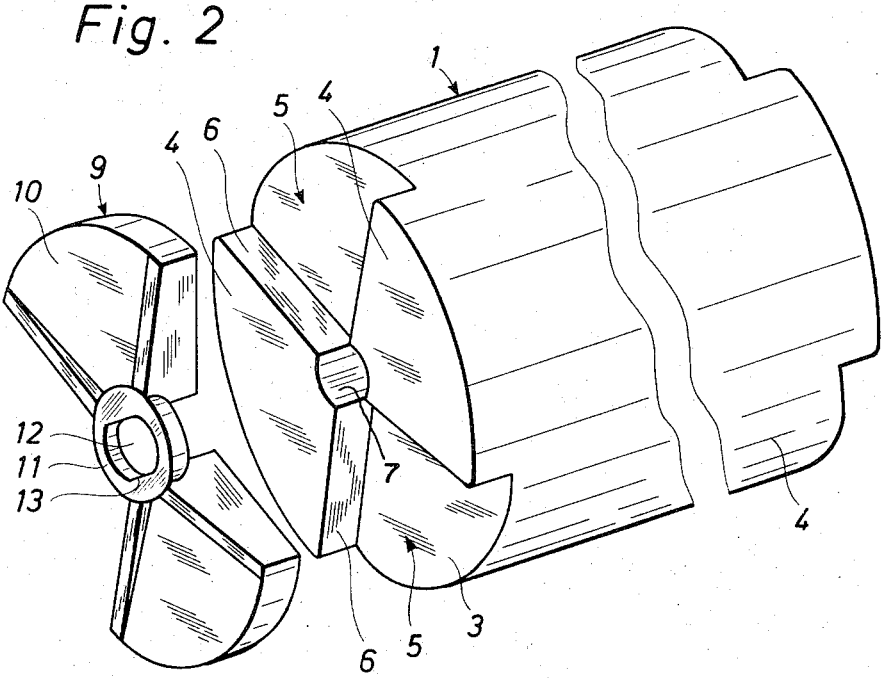
Figure 3:
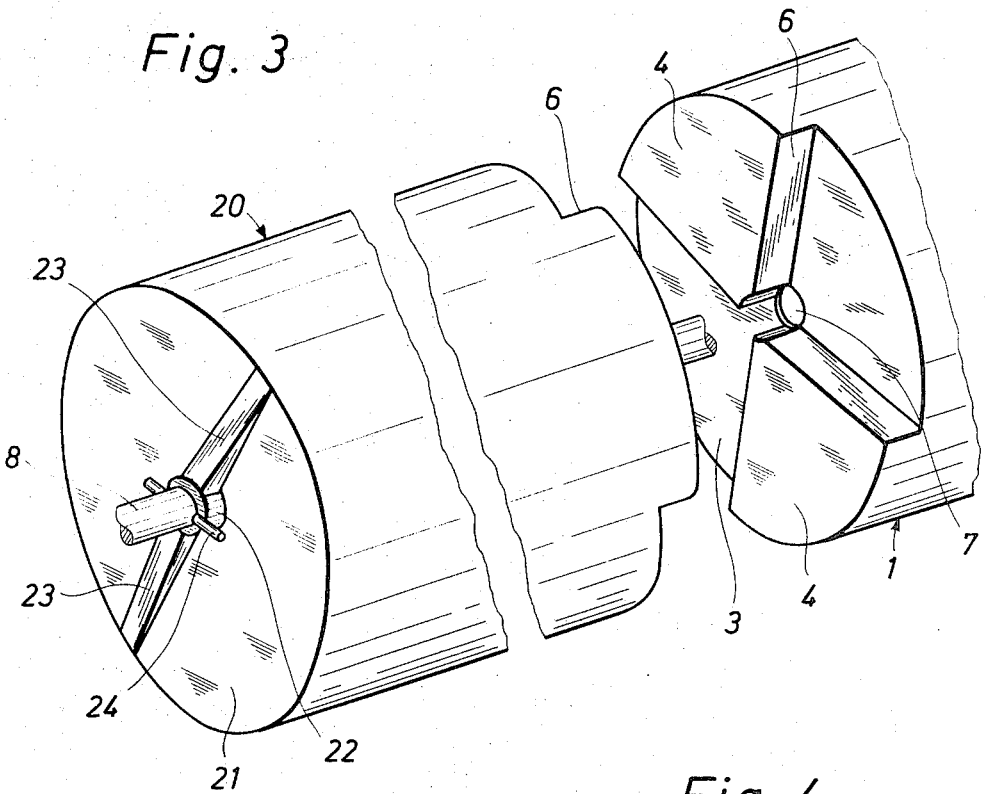
Figure 4:
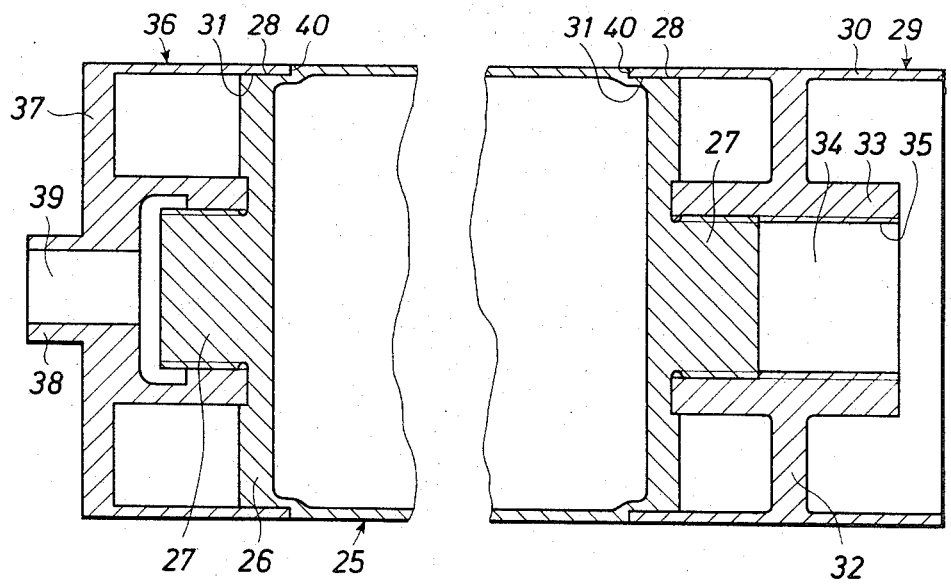

FIG. 1 shows a section through a roller according to the invention in mesh with another roller and a connecting member, FIG. 2 is a perspective view of the same in its disengaged condition, FIG. 3 is a modified embodiment of that shown in FIG. 2, and FIG. 4 is a modified embodiment of that shown in FIG. 1.

FIGS. 1 and 2 show a composite roller consisting of two rollers 1 of plastic material advantageously made by blow casting. Each roller has a cylindrical, tubular body 2 having at either end an end wall 3 with two sector-formed projecting parts 4, each extending over 90° of the circular end wall and forming between them two grooves 5 limited by two surfaces 6, which form an angle with each other, and by the outer surface of the flat end wall 3. The end wall 3 is provided with a bore 7 in which is supported a throughgoing common shaft 8 for the rollers.

A+ least at one end, but preferably at either end of the shaft 8 is provided a connecting member 9 formed roughly as a wing as it has two sector-formed parts 10 of the same shape as the projecting parts 4. The connecting member 9 has furthermore a hub 11 with a bore 12 of a substantially circular cross-section, corresponding to the circumference of the cross-section of the shaft 8, but furthermore limited by two chords 13 so that a shaft end portion 14 which is provided with two parallel surfaces corresponding to the chords 13 may be supported in the bore 12 and thereby provide a non-rotatable connection. An end portion 15 of the shaft 8 is of circular cross-section and supported in a ball bearing or roller bearing 16 resting in a fixed frame (not shown).

Usually there will also at the other end (not shown) of the composite roller be means corresponding to the connecting member 9, the shaft end portions 14 and 15 and the bearing 16.

As will appear from the Figures, all the rollers 1 and the connecting members 9 may be supported on a common throughgoing shaft 8, and when the parts are pushed together, the sector-formed, projecting parts 4 may be received in the grooves 5 between the corresponding projections of the adjacent roller. Similarly, the parts 10 of the connecting members 9 may be received in spaces 5, and carrier members are thereby provided between all parts of the roller so that these will rotate with the shaft as a unit supported in the two ball or roller bearings 16.

A composite roller may readily be taken apart and re-assembled to form another combination, that is, with more or fewer rollers 1 and a corresponding longer or shorter shaft, by which a very flexible conveyor system is provided.

To the right in FIG. 3 is shown a roller 1 of the kind described in the foregoing and having an end wall 3 with two sector-formed projecting parts 4 which constitute carrier surfaces 6 adapted to mesh with corresponding surfaces of the adjoining roller. The end wall 3 is provided with a bore 7 in which the shaft 8 of the roller is supported.

To the left in FIG. 3 is shown a roller 20 the right-hand end of which is of the same shape as the roller 1, whereas its left-hand end which forms the outer end of the composite roller has an end surface 21 with a central hub 22 which is supported by two transverse supporting members 23 and which carries the shaft 8. The shaft 8 has a through-going bore in which is provided a pin 24 received in a diametral groove provided in the hub 22, whereby there is provided a non-rotatable connection between the end wall 21 and the shaft 8 and consequently between the shaft 8 and the roller 20.

If the composite roller is only of a length corresponding to two rollers, use will ordinarily be made of two rollers of the kind denoted 20 so that the composite roller may be rigidly connected with the shaft 8 at either end. The same applies if the composite roller consists of a larger number of rollers, but theoretically it will be sufficient to use a single roller 20 with connection to the shaft.

FIG. 4 shows a third embodiment of a roller according to the invention, in which the roller proper is denoted 25. The roller has at either end an end wall 26 which carries a pipe end 27 with male screwthread. The roller 25 has further at either end a peripheral, cylindrical, outwardly facing fitting surface 28. For assembling two rollers 25 use is made of a connecting member 29 consisting of a tubular part 30 which is of the same outside diameter as the roller 25 and has an inside fitting surface 31 adapted to join the fitting surface 28.

The part 30 is provided with a partition 32 which carries a hub 33 with a bore 34 having a female screwthread 35 corresponding to the screwthread of the pin 27.

To the right in FIG. 4 is shown such a connecting member 29 attached to one end of a roller 25, and an adjoining roller 25 may be screwed into the screwthread 35 from the right-hand side of FIG. 4, so that the two rollers are rigidly coupled together by means of the connecting member 29.

At the ends of a roller composed of a plurality of rollers 25 may be used connecting members 36 like that shown to the left in FIG. 4. The said connecting member is formed substantially as one half of the connecting member 29 and on the outer side of the wall 37, which corresponds to the partition 32, but here constitutes an outer wall, the said connecting member has an axial journal 38 with a bore 39. The journal 38 is adapted to be received in a bearing or to form bearing for a carrying shaft which is received in the bore 39.

As will appear from the foregoing description and the Figures, the construction according to the invention provides in all embodiments a roller which, assembled with other corresponding rollers, may form a composite roller that is readily assembled and taken apart and is capable of providing substantial rigidity and durability, also when a comparatively cheap plastic material is used. In the embodiments according to FIGS. 1–3 the rigidity is obtained by means of the throughgoing shaft 8 which supports the roller at all end walls. In the embodiment according to FIG. 4 the necessary rigidity of the assembly is obtained by means of the screwthread, the fitting surfaces 28 and 31 and the shoulders 40 which are formed by the said surfaces and pressed tightly against corresponding shoulders of the roller, by which the use of a through-going shaft is dispensed with. When two rollers 25 are joined by means of a connecting member 29, there will be three partitions in each assembly of the composite roller, which affords sufficient rigidity. If desired, the connecting members 29 and 36 may be made of stronger material than the rollers 25 and by another process of manufacture.

I claim:

1. A sectional roller having an adjustable length for use in a roller conveyor comprising:
    at least one roller element including a tubular section having ends, a pair of end walls closing off the ends of the tubular section, a threaded means on each of the end walls of the tubular section, a peripheral means formed at both ends of the roller element;
    at least one tubular journal means detachably coupled to one of the end walls of the roller element, wherein the diameter of the journal means and the roller element are substantially equal, a surface means that continuously contacts and cooperates with the peripheral means, an end wall threaded means on the end wall that threadedly cooperates with one of the threaded means on the roller element for a rigid connection therebetween, a member extending from the end wall of the journal means for forming a journal; and
    at least one coupling element detachably mounted on the end wall of the roller element opposite the journal means and for detachable mounting with other roller elements including, a tubular section, a surface means at both ends of the tubular section for continuously contacting and cooperating with the peripheral means, a partition member, a threaded means extending from both sides of the partition member for detachable engagement with at least the other of the threaded means on the roller element.

2. The sectional roller as defined in claim 1 wherein the peripheral means and the cooperating surface means on the journal means and the coupling element are pressed tightly in contact with each other.

3. The sectional roller as defined in claim 2 wherein the surface means of both the journal means and the coupling element overlap the peripheral means.

4. A sectional roller for use in rolling conveyors comprising:
    at least one roller element including, a tubular section, a pair of end walls each closing ends of the tubular section, threaded connection means on each of the end walls for providing rigidity, and peripheral surface means formed at both ends of the tubular section;
    at least one journal means, including an end wall, a threaded connection means attached to the end wall of the journal means for cooperating with one of the threaded means on the roller element to provide both a detachable and rigid connection therebetween, and an overlapping means that continuously contacts the peripheral surface means for providing rigidity to the roller; and
    at least one coupling means including a member, a threaded means extending from both sides of the member for detachable engagement with at least the other of the threaded means on the roller element, thereby providing a rigid connection therebetween and an overlapping means that continuously contacts the peripheral surface means for providing rigidity to the roller.

5. The roller as defined in claim 4 wherein a bearing member extends from the end wall of the journal means for receiving a shaft.

\* \* \* \* \*